US012719598B2

(12) United States Patent
Park et al.

(10) Patent No.: US 12,719,598 B2
(45) Date of Patent: Aug. 25, 2026

(54) METHOD AND APPARATUS FOR AUGMENTING CHANNEL DATA IN COMMUNICATION SYSTEM

(71) Applicant: ELECTRONICS AND TELECOMMUNICATIONS RESEARCH INSTITUTE, Daejeon (KR)

(72) Inventors: Han Jun Park, Daejeon (KR); An Seok Lee, Daejeon (KR); Yong Jin Kwon, Daejeon (KR); Heesoo Lee, Daejeon (KR); Yu Ro Lee, Daejeon (KR); Yun Joo Kim, Daejeon (KR); Jung Bo Son, Daejeon (KR); Hyun Seo Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 325 days.

(21) Appl. No.: 18/526,232

(22) Filed: Dec. 1, 2023

(65) Prior Publication Data

US 2024/0204894 A1 Jun. 20, 2024

(30) Foreign Application Priority Data

Dec. 14, 2022 (KR) ........................ 10-2022-0175312
May 31, 2023 (KR) ........................ 10-2023-0069893

(51) Int. Cl.
*H04B 17/391* (2015.01)
*G01S 5/02* (2010.01)

(52) U.S. Cl.
CPC ........ *H04B 17/3913* (2015.01); *G01S 5/0236* (2013.01)

(58) Field of Classification Search
CPC .......................... H04B 17/3913; G01S 5/0236
See application file for complete search history.

(56) References Cited

U.S. PATENT DOCUMENTS

2015/0318908 A1* 11/2015 Ko ...................... H04B 7/0421 375/267
2021/0184795 A1 6/2021 Ibars et al.
2021/0194548 A1* 6/2021 Pezeshki ............... G06N 3/045
2021/0399924 A1 12/2021 Amjad et al.
2022/0029665 A1 1/2022 Hong et al.
2022/0060917 A1 2/2022 Vitthaladevuni et al.
2022/0132350 A1* 4/2022 Zhou .................... H04W 24/08
2022/0256359 A1* 8/2022 Awoniyi-Oteri ..... H04B 7/0608
2022/0294476 A1 9/2022 Seol et al.
2022/0294666 A1* 9/2022 Jeon ................... H04L 25/0254

(Continued)

FOREIGN PATENT DOCUMENTS

WO 2021/168013 A1 8/2021
WO 2022/000365 A1 1/2022
WO WO-2023097641 A1 * 6/2023 ........... H04W 24/00

OTHER PUBLICATIONS

Chao-Kai Wen et al., "Deep Learning for Massive MIMO CSI Feedback", arXiv:1712.08919v4 [cs.IT], pp. 1-5, Apr. 23, 2018.

*Primary Examiner* — Rina C Pancholi
(74) *Attorney, Agent, or Firm* — Rabin & Berdo, P.C.

(57) ABSTRACT

A method of a terminal may comprise: receiving augmentation assistance information from a base station; generating augmented channel data by applying the augmentation assistance information to original channel data; and training an artificial neural network using the augmented channel data.

14 Claims, 8 Drawing Sheets

(56) References Cited

U.S. PATENT DOCUMENTS

| | | | | |
|---|---|---|---|---|
| 2022/0300803 | A1 | 9/2022 | Cho et al. | |
| 2022/0393781 | A1 | 12/2022 | Kim et al. | |
| 2023/0017432 | A1 | 1/2023 | Ha et al. | |
| 2023/0090593 | A1 | 3/2023 | Kim | |
| 2024/0346384 | A1* | 10/2024 | Chai | G06F 18/214 |
| 2025/0175965 | A1* | 5/2025 | Li | H04B 7/0695 |

* cited by examiner

Figure 5:
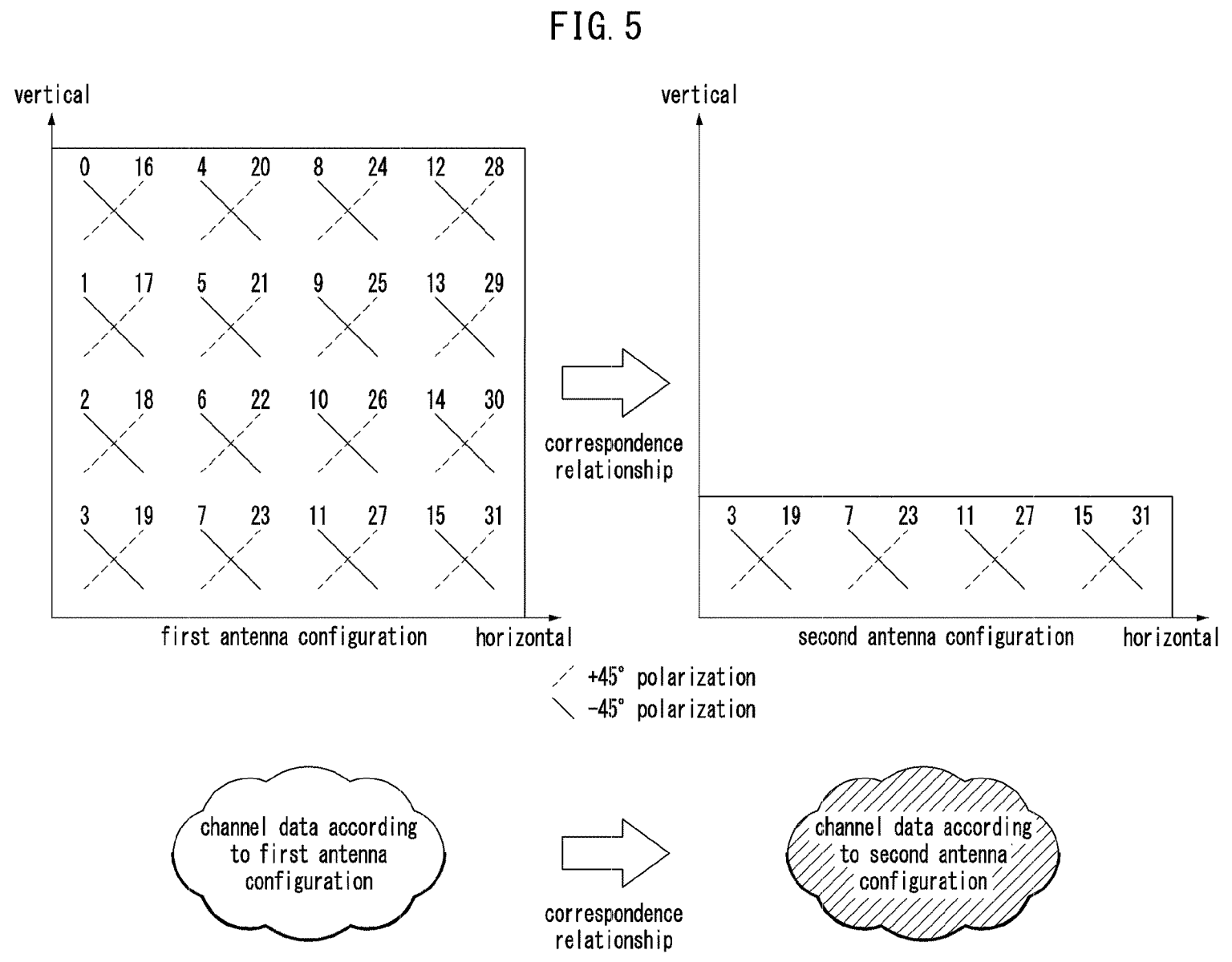

FIG. 5 vertical
horizontal
first antenna configuration 0 16 4 20 8 24 12 28
1 17 5 21 9 25 13 29
2 18 6 22 10 26 14 30
3 19 7 23 11 27 15 31 correspondence relationship vertical
horizontal
second antenna configuration 3 19 7 23 11 27 15 31

+45° polarization
-45° polarization channel data according to first antenna configuration correspondence relationship channel data according to second antenna configuration

FIG. 6

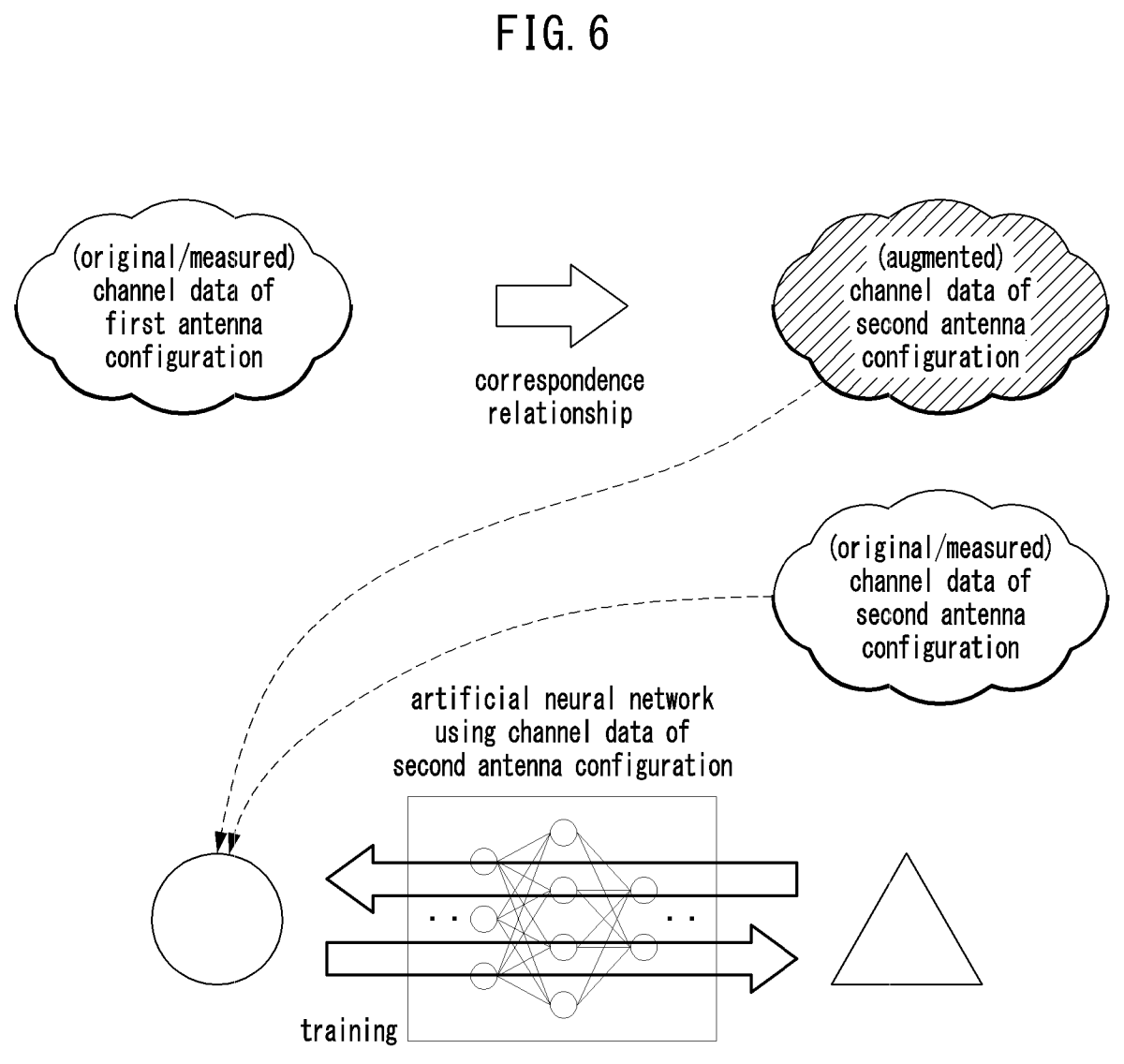

(original/measured) channel data of first antenna configuration correspondence relationship (augmented) channel data of second antenna configuration (original/measured) channel data of second antenna configuration artificial neural network using channel data of second antenna configuration training

FIG. 8 second antenna configuration horizontal vertical 0 4 1 5 2 6 3 7 linear transformation first antenna configuration horizontal vertical 0 16 1 17 2 18 3 19

Figure 8:
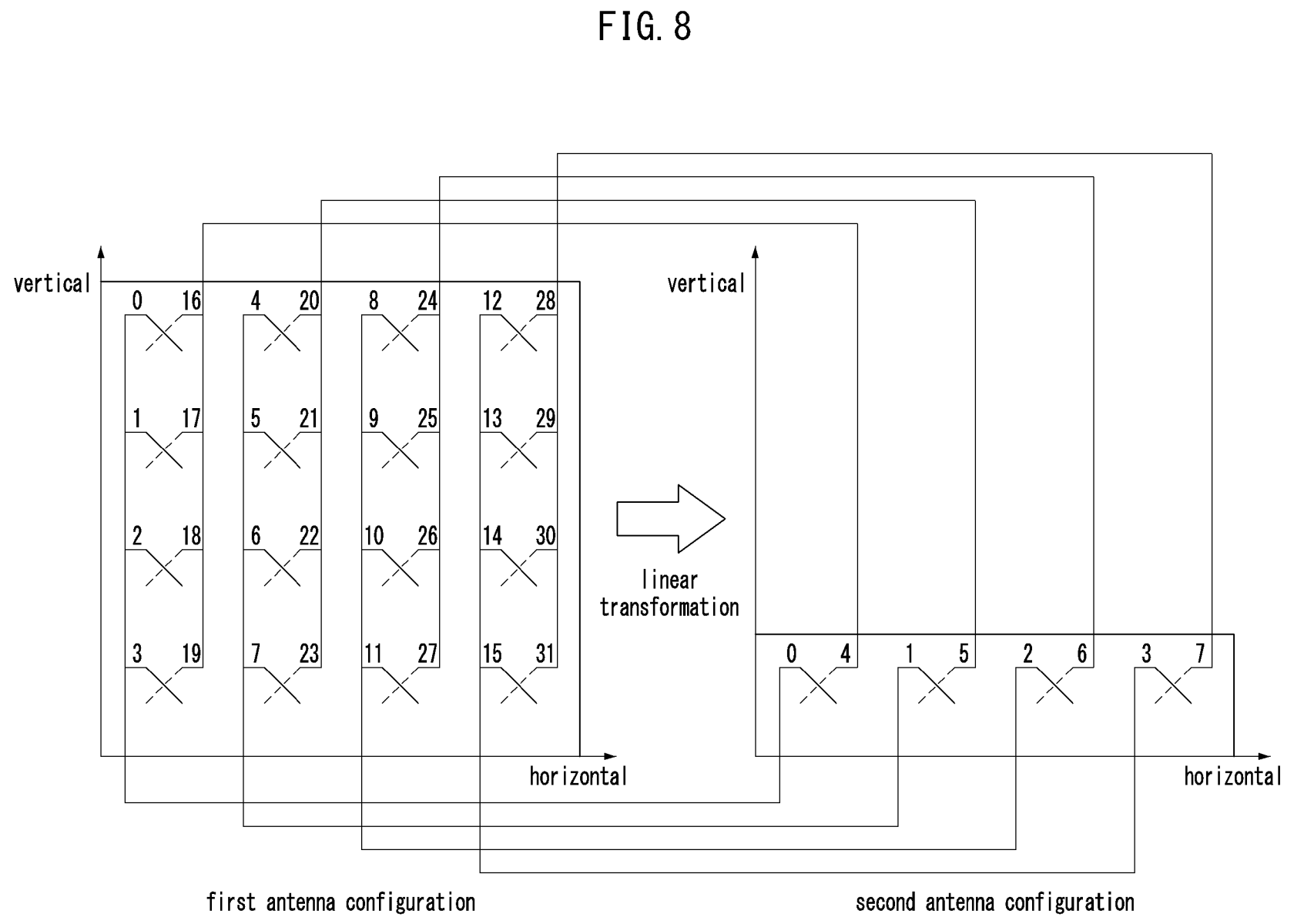

4 20 5 21 6 22 7 23

8 24 9 25 10 26 11 27

12 28 13 29 14 30 15 31

METHOD AND APPARATUS FOR AUGMENTING CHANNEL DATA IN COMMUNICATION SYSTEM

CROSS-REFERENCE TO RELATED APPLICATIONS

This application claims priority to Korean Patent Applications No. 10-2022-0175312, filed on Dec. 14, 2022, and No. 10-2023-0069893, filed on May 31, 2023, with the Korean Intellectual Property Office (KIPO), the entire contents of which are hereby incorporated by reference.

BACKGROUND

1. Technical Field

Exemplary embodiments of the present disclosure relate to a channel data augmentation technique in a communication system, and more specifically, to a channel data augmentation technique of a communication system, which allows a terminal to generate channel data based on a correspondence relationship between antenna configurations and to train artificial neural networks based on the generated channel data.

2. Related Art

With the development of information and communication technology, various wireless communication technologies have been developed. Typical wireless communication technologies include long term evolution (LTE), new radio (NR), 6th generation (6G) communication, and/or the like. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

Recently, aided by advancements in Artificial Intelligence (AI) and Machine Learning (ML) techniques, the academic and industrial sectors are actively conducting researches to apply AI/ML techniques to mobile communication systems. In addition, modern commercial mobile communication systems can employ multiple-input multiple-output (MIMO) transmission and reception techniques based on multiple antennas. Accordingly, the academic and industrial sectors are studying approaches to utilize AI/ML techniques for mobile communications in MIMO-based mobile communication systems, taking into account the characteristics of such commercial mobile communication systems. In this regard, many artificial neural network models for mobile communications can utilize multi-antenna channel data as input. In this case, conventional techniques assume specific antenna configurations, and thus a terminal and a base station need to independently secure multi-antenna channel data for the respective antenna configurations, and need to construct independent artificial neural networks for the respective antenna configurations. Consequently, the costs for artificial neural network training and construction may increase.

SUMMARY

Exemplary embodiments of the present disclosure are directed to providing a method and an apparatus for augmenting channel data in a communication system, in which a base station delivers information on a correspondence relationship between antenna configurations to a terminal, and the terminal trains artificial neural networks by generating channel data based on the correspondence relationship between antenna configurations.

According to a first exemplary embodiment of the present disclosure, a method of a terminal may comprise: receiving augmentation assistance information from a base station; generating augmented channel data by applying the augmentation assistance information to original channel data; and training an artificial neural network using the augmented channel data.

The method may further comprise, before the generating of the augmented channel data, receiving default antenna configuration information from the base station; receiving information on measurement resources according to the default antenna configuration information from the base station; and generating the original channel data through measurement on the measurement resources.

The method may further comprise, before the generating of the augmented channel data, receiving channel environment change information from the base station, wherein the augmented channel data is generated by reflecting the received channel environment change information and applying the augmentation assistance information to the original channel data.

The channel environment change information may include at least one of information on a channel bandwidth, information on a number of subbands, information on a reference signal pattern, mobility information of the terminal, signal-to-noise ratio (SNR), or interference environment information.

The augmentation assistance information may include at least one of a correspondence relationship between the original channel data and the augmented channel data, information on an artificial neural network model for generating the augmented channel data from the original channel data, or information on a correspondence relationship between a first antenna configuration related to the original channel data and a second antenna configuration related to the augmented channel data.

The correspondence relationship between the first antenna configuration and the second antenna configuration may be a linear transformation relationship between the first antenna configuration and the second antenna configuration.

The method may further comprise, before the receiving of the augmentation assistance information from the base station, requesting transmission of the augmentation assistance information from the base station.

The method may further comprise, before the receiving of the augmentation assistance information from the base station, transmitting, to the base station, terminal capability information including information on whether the terminal is able to utilize the augmentation assistance information;

and receiving the augmentation assistance information transmitted from the base station based on the terminal capability information.

According to a second exemplary embodiment of the present disclosure, a method of a base station may comprise: transmitting augmentation assistance information to a terminal; receiving augmented channel data from the terminal, the augmented channel data being generated by applying the augmentation assistance information to original channel data; and training an artificial neural network using the augmented channel data.

The method may further comprise, before the transmitting of the augmentation assistance information to the terminal, receiving, from the terminal, a request for transmission of the augmentation assistance information; and transmitting the augmentation assistance information to the terminal in response to the request for transmission of the augmentation assistance information.

The method may further comprise, before the transmitting of the augmentation assistance information to the terminal, receiving, from the terminal, terminal capability information including information on whether the terminal is able to utilize the augmentation assistance information; and transmitting the augmentation assistance information to the terminal based on the terminal capability information.

The method may further comprise, before the augmented channel data is generated, transmitting channel environment change information to the terminal, wherein the augmented channel data is data augmented from the original channel data by reflecting the channel environment change information.

According to a third exemplary embodiment of the present disclosure, a terminal may comprise a processor, and the processor may cause the terminal to perform: receiving augmentation assistance information from a base station; generating augmented channel data by applying the augmentation assistance information to original channel data; and training an artificial neural network using the augmented channel data.

The processor may further cause the terminal to perform, before the generating of the augmented channel data, receiving default antenna configuration information from the base station; receiving information on measurement resources according to the default antenna configuration information from the base station; and generating the original channel data through measurement on the measurement resources.

The processor may further cause the terminal to perform, before the generating of the augmented channel data, receiving channel environment change information from the base station, wherein the augmented channel data is generated by reflecting the received channel environment change information and applying the augmentation assistance information to the original channel data.

The channel environment change information may include at least one of information on a channel bandwidth, information on a number of subbands, information on a reference signal pattern, mobility information of the terminal, signal-to-noise ratio (SNR), or interference environment information.

The augmentation assistance information may include at least one of a correspondence relationship between the original channel data and the augmented channel data, information on an artificial neural network model for generating the augmented channel data from the original channel data, or information on a correspondence relationship between a first antenna configuration related to the original channel data and a second antenna configuration related to the augmented channel data.

According to the present disclosure, a first node can deliver augmentation assistance information used for generating augmented channel data from original channel data to a second node. Then, the second node can obtain the augmented channel data by applying the received augmentation assistance information to the original channel data, and can utilize the augmented channel data to train and construct artificial neural network(s). Since the second node (e.g., terminal) can obtain augmented channel data for other antenna configurations, which is used as training data for training artificial neural network(s), based on original channel data for a reference antenna configuration, the costs for training can be remarkably reduced.

BRIEF DESCRIPTION OF DRAWINGS

FIG. 5 is a conceptual diagram illustrating a first exemplary embodiment of a channel data augmentation method using a correspondence relationship between antenna configurations.

FIG. 6 is a conceptual diagram illustrating a first exemplary embodiment of an artificial neural network training method using channel data for multiple antennas.

FIG. 8 is a conceptual diagram illustrating a first exemplary embodiment of a correspondence relationship between antenna configurations.

DETAILED DESCRIPTION OF THE EMBODIMENTS

Figure 1:
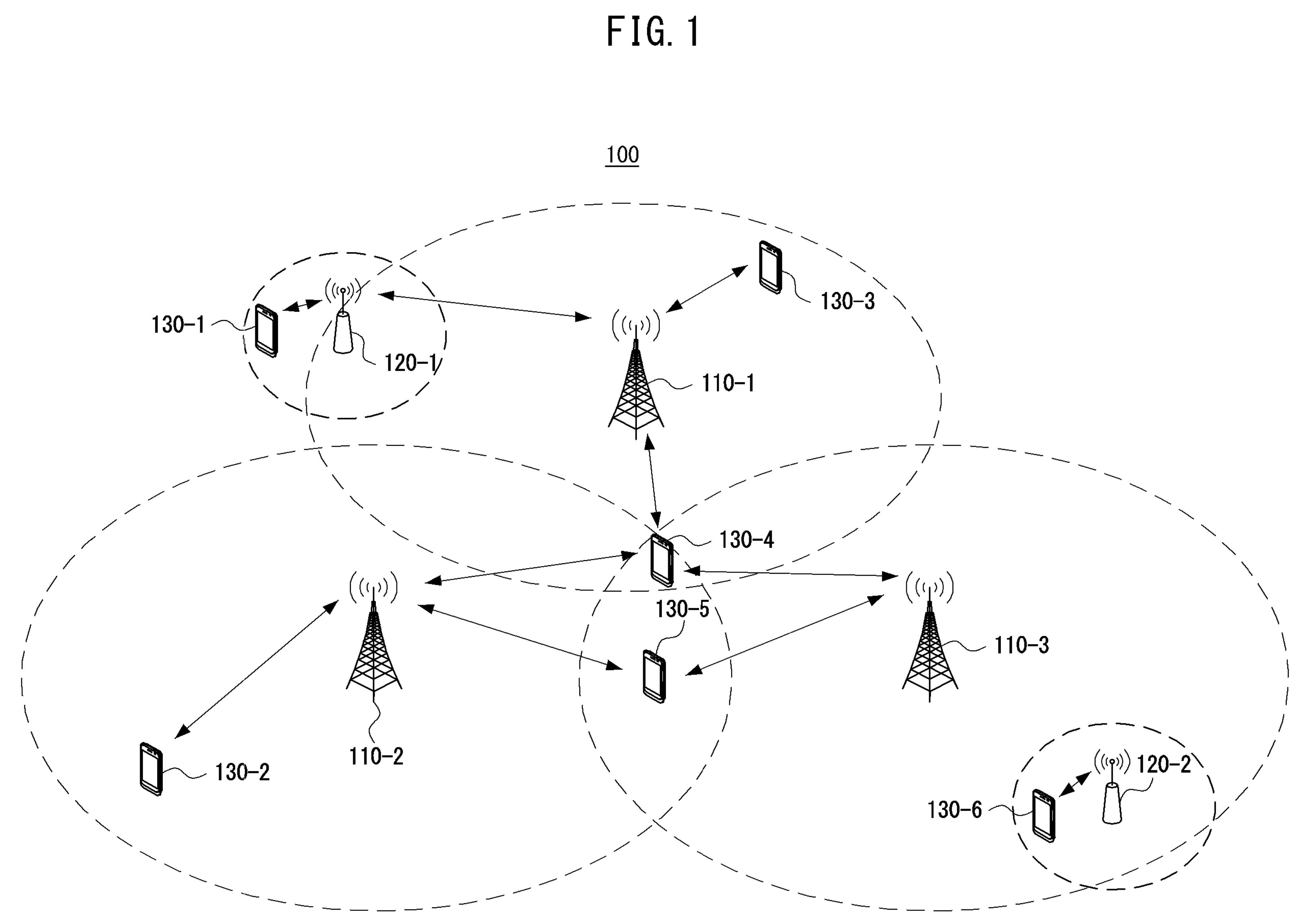
FIG. 1 is a conceptual diagram illustrating a first exemplary embodiment of a communication system.

Since the present disclosure may be variously modified and have several forms, specific exemplary embodiments will be shown in the accompanying drawings and be described in detail in the detailed description. It should be understood, however, that it is not intended to limit the present disclosure to the specific exemplary embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term “and/or” means any one or a combination of a plurality of related and described items.

In exemplary embodiments of the present disclosure, “at least one of A and B” may refer to “at least one of A or B”

or "at least one of combinations of one or more of A and B". In addition, "one or more of A and B" may refer to "one or more of A or B" or "one or more of combinations of one or more of A and B".

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it will be understood that a further component is not disposed therebetween.

The terms used in the present disclosure are only used to describe specific exemplary embodiments, and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figure 2:
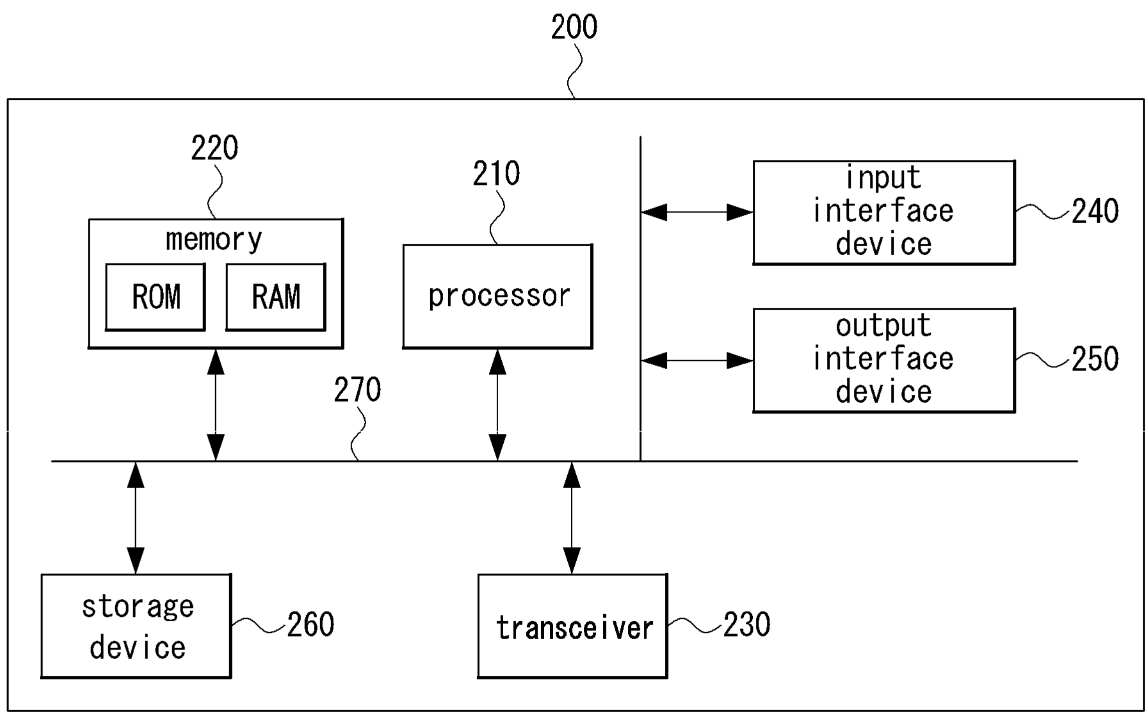
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), New radio (NR), etc.). Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (COMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

Meanwhile, AI/ML techniques have recently achieved remarkable results in the fields of image and natural language processing. Aided by these advancements in the AI/ML techniques, both academic and industrial sectors are actively conducting researches to apply the AI/ML techniques to mobile communication systems. For instance, the 3rd generation partnership project (3GPP), an international standardization organization, is conducting researches to apply the AI/ML techniques to radio interfaces of mobile communication systems. In such the researches, the 3GPP considers the following three use cases as representative use cases.

(1) AI/ML-based channel state information (CSI) feedback (2) AI/ML-based beam management (3) AI/ML-based positioning In the AI/ML-based CSI feedback use case, the 3GPP is discussing AI/ML-based CSI compression methods for compressing channel information and AI/ML-based CSI prediction methods for predicting future channel information. Furthermore, in the AI/ML-based beam management use case, the 3GPP is discussing AI/ML-based beam prediction methods for predicting information on beams in the time/space domain. In addition, in the AI/ML-based positioning use case, the 3GPP is discussing AI/ML-based methods for directly estimating a position of a terminal, as well as methods for assisting traditional positioning techniques based on AI/ML.

Meanwhile, the academic sector is conducting researches in the direction of applying AI/ML techniques across the entire spectrum of mobile communications, including the above-described representative use cases. Specifically, the academic sector has proposed CSI compression methods utilizing convolutional neural network (CNN)-based auto-encoders, a type of AI/ML technique, in relation to the AI/ML-based CSI feedback use case. The autoencoder technique implies a neural network structure that copies input to output. The autoencoder may be configured with a smaller number of neurons in a hidden layer between an encoder and a decoder than an input layer, enabling data compression (or dimensionality reduction). In the AI/ML-based CSI compression technique, artificial neural networks can be trained to compress channel information into CSI, so that the CSI corresponds to latent variables (or codes) in a latent space.

Meanwhile, commercial mobile communication systems can utilize MIMO transmission and reception techniques based on multiple antennas. For instance, domestic and international commercial mobile communication systems can employ radio units (RUS) each having a 4-port or 8-port antenna configuration. Furthermore, to support massive MIMO techniques, the commercial mobile communication systems can increase utilization of a massive MIMO unit (MMU) having 32 or more antenna ports. Considering the characteristics of such commercial mobile communication systems, the academic and industrial sectors are researching approaches to apply the AI/ML techniques for mobile communication in the MIMO-based mobile communication systems.

The deep learning techniques, used to construct artificial neural networks, are primarily researched within the realm of AI/ML techniques. Moreover, many artificial neural network models for mobile communication can utilize multi-antenna channel data as input. In this regard, conventional techniques may assume a specific antenna configuration. Researches have been conducted on training and inference processes of artificial neural networks using multi-antenna channel data within a system having a fixed antenna configuration. For example, arrangement of antenna ports of a type 1 single panel, which is defined by the 3GPP, may be considered as the specific antenna configuration.

Figure 3:
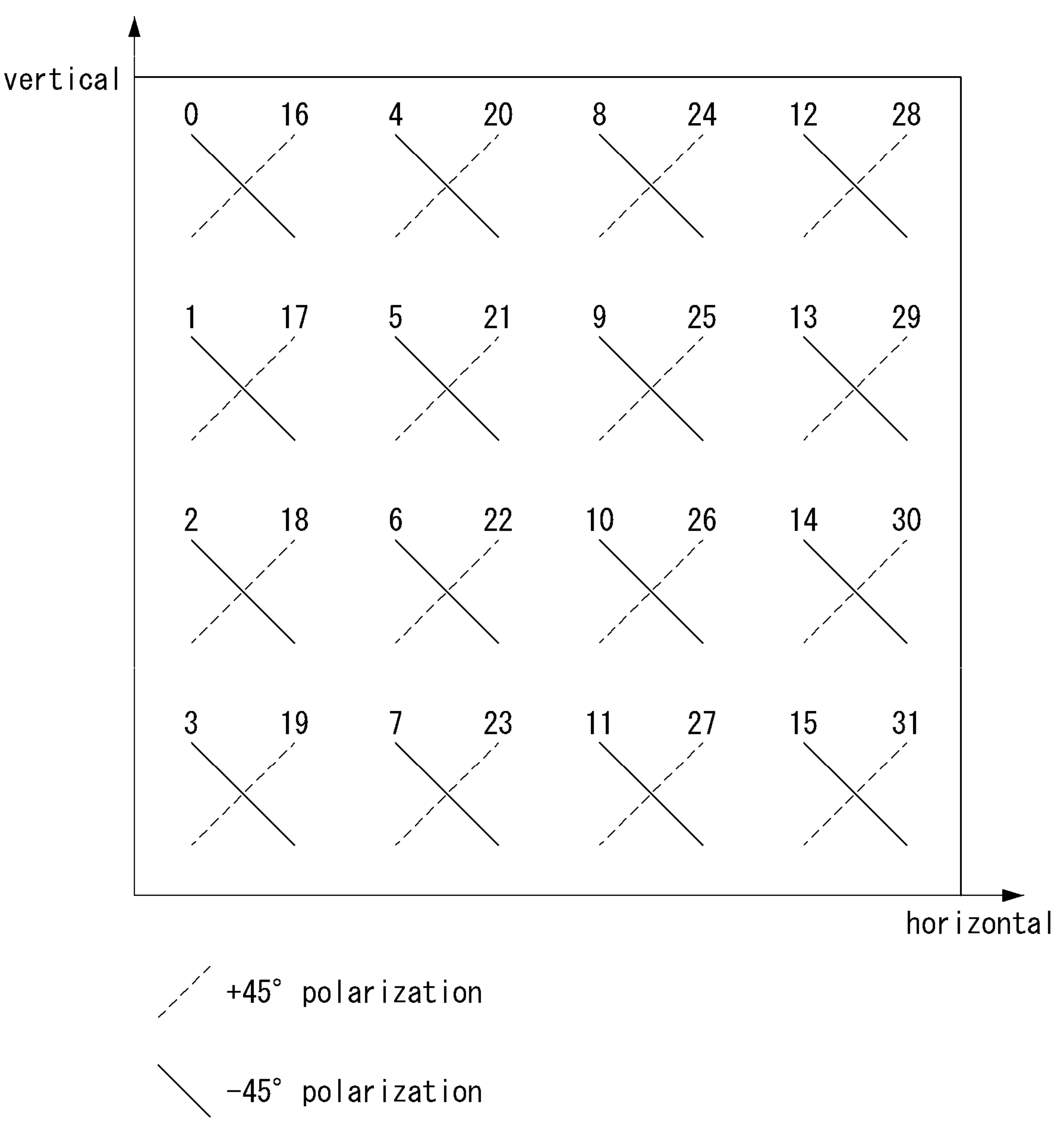
FIG. 3 is a conceptual diagram illustrating a first exemplary embodiment of a cross-polarized antenna.

FIG. 3 is a conceptual diagram illustrating a first exemplary embodiment of a cross-polarized antenna.

Referring to FIG. 3, a cross-polarized antenna may have a plurality of horizontal antenna elements and a plurality of vertical antenna elements. For example, the cross-polarized antenna may have N1 horizontal antenna elements and N2 vertical antenna elements. Here, each of N1 and N2 may be a positive integer. Here, N1 and N2 may be defined as (N1, N2)=(4, 4). In this case, the cross-polarized antenna may have a 32-port antenna configuration (i.e., 4×4×2=32). However, an actual commercial mobile communication system may change the antenna configuration supported for the same RU/MMU according to a network operator's configuration. For example, an MMU that supports up to the 32-port antenna configuration may support 4/8/16-port antenna configurations depending on the network operator's configuration. In this case, according to the prior arts, a terminal and a base station may independently secure multi-antenna channel data for the respective antenna configurations (i.e., 4/8/16/32-ports) to construct independent artificial neural networks. Accordingly, the costs for training and constructing artificial neural networks may increase.

Accordingly, in order to solve the above-described problem in the prior arts, the present disclosure provides a method and an apparatus for efficiently performing training and construction of artificial neural networks for multiple antenna configurations using multi-antenna channel data in the mobile communication system.

For convenience of description below, channel data augmentation methods proposed in the present disclosure will be mainly described from a downlink perspective of a wireless mobile communication system consisting of a base station and a terminal. However, the proposed methods of the present disclosure may be extended and applied to any wireless mobile communication system consisting of a transmitter and a receiver.

[Method 1]

The present disclosure provides a channel data augmentation method in a mobile communication system consisting of a base station and one or more terminals.

Figure 4:
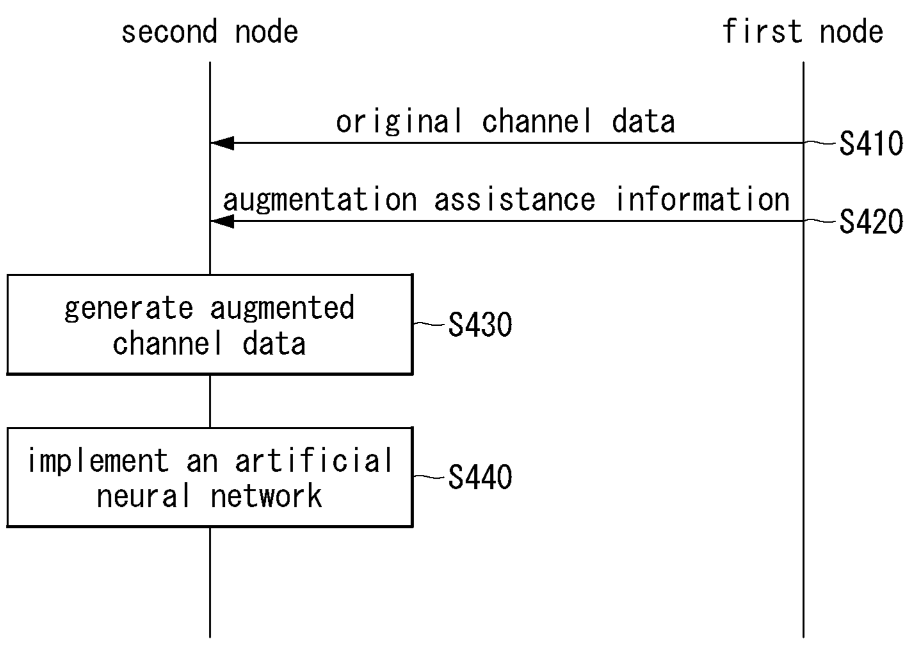
FIG. 4 is a sequence chart illustrating a first exemplary embodiment of a channel data augmentation method in a communication system.

FIG. 4 is a sequence chart illustrating a first exemplary embodiment of a channel data augmentation method in a communication system.

Referring to FIG. 4, a first node may deliver original channel data to a second node (S410), and the second node may receive the original channel data from the first node. Alternatively, the second node may independently generate the original channel data. In addition, the first node may transmit augmentation assistance information to be used for generating augmented channel data from the original channel data to the second node (S420). Then, the second node may receive the augmentation assistance information from the first node. Thereafter, the second node may obtain augmented channel data by applying the augmentation assistance information to the original channel data (S430), and the second node may implement an artificial neural network using the augmented channel data (S440). That is, the second node may construct and train an artificial neural network using the augmented channel data. Here, each of the first node and the second node may be one of a base station, a terminal, an entity that manages artificial neural network(s) of the base station, and an entity that manages artificial neural network(s) of the terminal. In addition, the augmentation assistance information may include a correspondence relationship (or functional relationship) between channel data (i.e., the original channel data and the augmented channel data) or an artificial neural network model that generates the augmented channel data.

As an exemplary embodiment of the present disclosure, in a mobile communication system consisting of a base station and a terminal, the terminal may construct an artificial neural network that utilizes multi-antenna channel for training and inference. In this case, there may be more than one antenna configuration for a channel configurable by the base station. Then, when the terminal desires to obtain channel data for training the artificial neural network, the terminal may need to secure channel data for each antenna configuration. For example, the number of antenna configurations supported by the base station may be four (e.g., 32/16/8/4-port configurations).

In the above-described case, the terminal may need to obtain channel data for each of the antenna configurations. In order to obtain the channel data, the base station may transmit measurement resources for the corresponding antenna configuration to the terminal. Then, the terminal may perform measurement for a sufficiently long time and secure channel data having a sufficient size according to the corresponding antenna configuration. This process may require large communication costs for both the terminal and the base station. Therefore, it may be efficient for the terminal to secure necessary channel data with as few measurement processes as possible. Accordingly, according to the present disclosure, in a mobile communication system consisting of a base station and one or more terminals, the first node may deliver the augmentation assistance information capable of generating augmented channel data from original channel data to the second node. In this case, when the first node wirelessly deliver configuration information for collecting training data to the second node, the augmentation assistance information may be delivered as being included in the configuration information. Then, the second node may obtain the augmented channel data by applying the augmentation assistance information received to the original channel data, and the second node may utilize the augmented channel data for training and constructing the artificial neural network.

For example, when multiple antenna configurations are supported, the base station and the terminal may share a default antenna configuration which becomes a reference. As an example, the base station may deliver information on the default antenna configuration to the terminal. Then, the terminal may receive information on the default antenna configuration from the base station. Thereafter, the base station may transmit measurement resources suitable for the default antenna configuration to the terminal. The terminal may perform measurement for a sufficiently long period of time and secure channel data having a sufficient size according to the default antenna configuration.

Thereafter, the base station may deliver the augmentation assistance information used for generating augmented channel data from the channel data (i.e., original channel data obtained for the default antenna configuration) to the terminal. Then, the terminal may obtain the augmented channel data by applying the received augmentation assistance information to the original channel data, and the terminal may utilize the augmented channel data for training and constructing the artificial neural network. As described above, the terminal may measure the channel data for the default antenna configuration, and the terminal may obtain channel data for the remaining antenna configurations by augmenting the channel data for the default antenna configuration by applying a correspondence relationship (or functional relationship) between the antenna configurations. Accordingly, the measurement process for channel data in the base station and terminal may be performed once for the default antenna configuration. To this end, the base station may deliver the augmentation assistance information used for generating augmented channel data from original channel data to the terminal. [Method 1] may be applied together with other proposed Method(s) of the present disclosure to the extent that they do not conflict with each other.

[Method 2]

The present disclosure provides a method of generating multi-antenna channel data (or augmented channel data) for a second antenna configuration from multi-antenna channel data (or original channel data) for a first antenna configuration by applying a correspondence relationship (or functional relationship) between the first antenna configuration and the second antenna configuration. Here, the first antenna configuration and the second antenna configuration may not be the same. In particular, the number of antenna ports supported by the first antenna configuration may be greater than or equal to the number of antenna ports supported by the second antenna configuration. In addition, the augmented channel data may be used in a training and/or inference process of an artificial neural network using multi-antenna channel data for the second antenna configuration.

As an exemplary embodiment of the present disclosure, in a mobile communication system consisting of a base station and a terminal, the terminal and the base station may utilize artificial neural networks for CSI feedback that compress and restore channel information. Specifically, the terminal may compress channel information using an encoder neural network and report it to the base station. Then, the base station may restore the compressed channel information by a decoder neural network back to the original channel information. The artificial neural networks for CSI feedback may be trained using multi-antenna channel data. A training entity of the artificial neural networks may need to secure sufficient multi-antenna channel data for training. However, antenna configurations for multiple antennas may exist in various ways. For example, if the base station supports up to a 32-port antenna configuration, the base station and the terminal may group some antenna ports of 32 ports to configure a 16/8/4-port antenna configuration, which has a smaller number of ports than 32 ports. Therefore, if the training entity of the artificial neural networks for CSI feedback desires to collect channel data for 32/16/8/4-port antennas configurations for training purposes, a series of processes such as transmission of channel measurement resources, channel measurement, and transmission of measured channel data may need to be performed for each antenna configuration. These processes may consume costs several times that of channel data collection for a single antenna configuration.

Therefore, for the purpose of efficiently securing multi-antenna channel data, the present disclosure proposes the method of generating multi-antenna channel data (or augmented channel data) for the second antenna configuration from multi-antenna channel data (or original channel data) for the first antenna configuration by applying a correspondence relationship (or functional relationship) between the first antenna configuration and the second antenna configuration. Typically, in a commercial mobile communication system, a logical antenna port may be configured as a linear combination of physical antenna ports. Considering this, the proposed method of the present disclosure may be used as a method to augment channel data for a logical antenna port by applying linear transformation to channel data for physical antenna ports.

In the case where the base station and the terminal applies 32/16/8/4-port antenna configurations, if the proposed method of the present disclosure is applied, channel data for the entire 32/16/8/4-port antenna configurations can be generated using only the multi-antenna channel data for the 32-port antenna configuration and the correspondence relationship for generating channel data for the 16/8/4-port antenna configurations from channel data for the 32-port antenna configuration, thereby efficiently collecting data.

FIG. 5 is a conceptual diagram illustrating a first exemplary embodiment of a channel data augmentation method using a correspondence relationship between antenna configurations.

Referring to FIG. 5, a first antenna configuration may be a 32-port antenna configuration, and a second antenna configuration may be a 4-port antenna configuration. Accordingly, the terminal may generate augmented channel data for the second antenna configuration by applying a correspondence relationship between the first antenna configuration and the second antenna configuration to channel data for the first antenna configuration. [Method 2] may be applied together with other proposed Method(s) of the present disclosure to the extent that they do not conflict with each other.

[Method 3]

The present disclosure proposes a method of training an artificial neural network by using channel data augmented by applying a correspondence relationship (or functional relationship) between the first and second antenna configurations to channel data for the first antenna configuration and/or channel data for the second antenna configuration as training data. The method may be used when an artificial neural network using multi-antenna channel data for the second antenna configuration needs to be trained. Here, the channel data for the second antenna configuration may mean channel data measured or generated for the second antenna configuration.

As an exemplary embodiment of the present disclosure, in a mobile communication system consisting of a base station and a terminal, the terminal and the base station may utilize artificial neural networks for CSI feedback that compress and restore channel information. According to the proposed method of the present disclosure, a training entity of the artificial neural networks for CSI feedback may apply the correspondence relationship (or functional relationship) between antenna configurations to the original channel data for the first antenna configuration to obtain the augmented channel data for the second antenna configuration. The present disclosure provides a method of training the artificial neural network by using channel data augmented by applying the correspondence relationship (or functional relationship) between the first antenna configuration and the second antenna configuration to channel data for the first antenna configuration and/or channel data for the second antenna configuration as training data, when the artificial neural network using multi-antenna channel data for the second antenna configuration needs to be trained.

In other words, the artificial neural network using multi-antenna channel data for the second antenna configuration may be trained utilizing channel data measured or generated directly for the second antenna configuration. Alternatively, when the directly measured or generated data for the second antenna configuration is not available, the artificial neural network using multi-antenna channel data for the second antenna configuration may be trained using data augmented by applying the correspondence relationship between the antenna configurations to the channel data for the first antenna configuration. Through the proposed method of the present disclosure, a receiver (or, artificial neural network management entity of the receiver) and/or a transmitter (or, artificial neural network management entity of the transmitter) may reduce communication costs consumed for data exchange when training the artificial neural network.

FIG. 6 is a conceptual diagram illustrating a first exemplary embodiment of an artificial neural network training method using channel data for multiple antennas.

Referring to FIG. 6, the terminal may generate augmented channel data for the second antenna configuration by applying the correspondence relationship between the first and second antenna configurations to original channel data for the first antenna configuration. Alternatively, the terminal may generate augmented channel data for the second antenna configuration by applying the correspondence relationship between the first and second antenna configurations to measured channel data for the first antenna configuration. Alternatively, the terminal may obtain original channel data for the second antenna configuration from the base station. Alternatively, the terminal may obtain measured channel data for the second antenna configuration by measuring it through measurement resources transmitted from the base station.

Thereafter, the terminal may train the artificial neural network for the second antenna configuration using the original channel data for the second antenna configuration. Alternatively, the terminal may train the artificial neural network for the second antenna configuration using the measured channel data for the second antenna configuration. Alternatively, the terminal may train the artificial neural network for the second antenna configuration using the augmented channel data for the second antenna configuration. [Method 3] may be applied together with other proposed Method(s) of the present disclosure to the extent that they do not conflict with each other.

[Method 4]

The present disclosure proposes a method in which a receiver (e.g., terminal) (or, artificial neural network management entity of the receiver) reports to a transmitter (e.g., base station) (or, artificial neural network management entity of the transmitter) that it has capability of augmenting multi-antenna channel data based on a correspondence relationship (or functional relationship) between antenna configurations. Alternatively, the present disclosure proposes a method in which a receiver (e.g., terminal) (or, artificial neural network management entity of the receiver) requests a transmitter (e.g., base station) (or, artificial neural network management entity of the transmitter) to deliver a correspondence relationship (or functional relationship) between antenna configurations.

As an exemplary embodiment of the present disclosure, in a mobile communication system consisting of a base station and a terminal, the terminal and the base station may utilize artificial neural networks for CSI feedback that compress and restore channel information. According to the proposed method of the present disclosure, a training entity of the artificial neural networks for CSI feedback may apply the correspondence relationship (or functional relationship) between antenna configurations to original channel data for the first antenna configuration to secure augmented channel data for the second antenna configuration. Here, it may be assumed that the training entity is the receiver (e.g., terminal) (or, artificial neural network management entity of the receiver).

Figure 7:
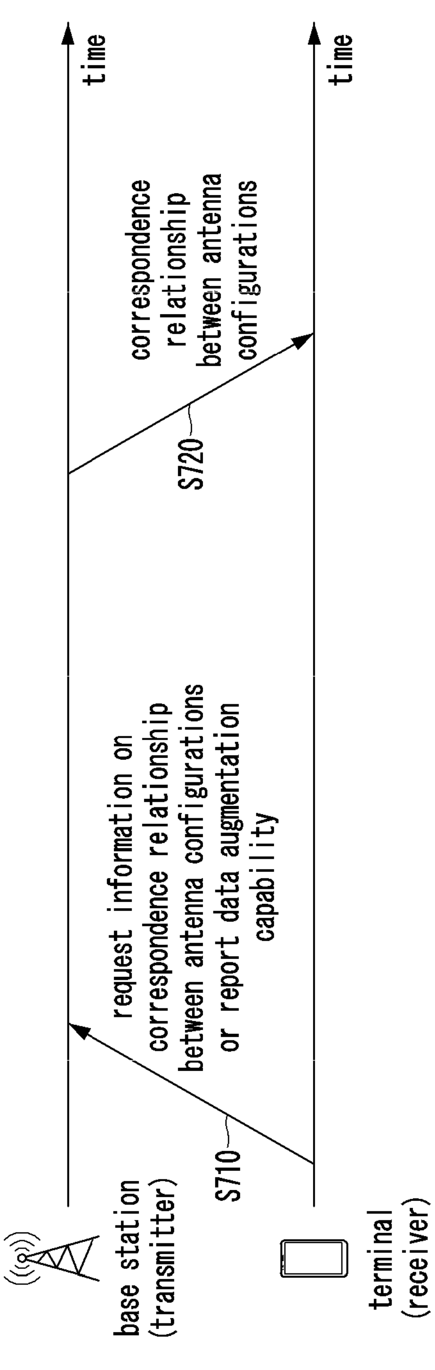
FIG. 7 is a conceptual diagram illustrating a first exemplary embodiment of a method for delivering information on a correspondence relationship between antenna configurations.

FIG. 7 is a conceptual diagram illustrating a first exemplary embodiment of a method for delivering information on a correspondence relationship between antenna configurations.

Referring to FIG. 7, a receiver (e.g., terminal) (or, artificial neural network management entity of the receiver) may report, to a transmitter, (e.g., base station) (or, artificial neural network management entity of the transmitter), that the receiver has capability of augmenting multi-antenna channel data based on a correspondence relationship (or functional relationship) between antenna configurations. Alternatively, the receiver (e.g., terminal) (or, artificial neural network management entity of the receiver) may request the transmitter, (e.g., base station) (or, artificial neural network management entity of the transmitter) to deliver information on the correspondence relationship (or functional relationship) between antenna configurations. After receiving the capability report or the request, the transmitter (e.g., base station) (or artificial neural network management entity of the transmitter) may deliver, to the receiver (e.g., terminal) (or artificial neural network management entity of the receiver), information on the corresponding relationship (or functional relationship) between antenna configurations (S720). [Method 4] may be applied together with other proposed Method(s) of the present disclosure to the extent that they do not conflict with each other.

[Method 5]

The present disclosure proposes a method in which a transmitter (e.g., base station) (or, artificial neural network management entity of the transmitter) delivers, to a receiver (e.g., terminal) (or, artificial neural network management entity of the receiver), information on a correspondence relationship (or functional relationship) between a first antenna configuration and a second antenna configuration. The method may be used when the transmitter can apply the first antenna configuration and the second antenna configuration. Here, the information on the correspondence relationship (or functional relationship) between the first and second antenna configurations may be delivered along with a channel data set for the first antenna configuration. Then, the receiver may receive the channel data set for the first antenna configuration from the transmitter. In this case, the receiver may achieve an effect of receiving both the channel data set for the first antenna configuration and a channel data set for the second antenna configuration.

Here, the information on the correspondence relationship (or functional relationship) between antenna configurations may be delivered as explicit information that allows the receiver (or artificial neural network management entity of the receiver) to reconstruct the correspondence relationship (or functional relationship) between antenna configurations. Alternatively, the information on the correspondence relationship (or functional relationship) between antenna configurations may be delivered in a form of an executable file that allows the receiver (or artificial neural network management entity of the receiver) to apply multi-antenna channel data for the first antenna configuration as input. In the latter case, an output after execution may be multi-antenna channel data (or augmented channel data) for the second antenna configuration.

However, the information on the correspondence relationship (or functional relationship) between antenna configurations may be different from that of a correspondence relationship between the first and second antenna configurations actually applied in the transmitter. Accordingly, the information on the correspondence relationship (or functional relationship) between antenna configurations may be information delivered for reference for data augmentation.

As an exemplary embodiment of the present disclosure, in a mobile communication system consisting of a base station and a terminal, the terminal and the base station may utilize artificial neural networks for CSI feedback that compress and restore channel information. According to the proposed method of the present disclosure, a training entity of the artificial neural networks for CSI feedback may apply the correspondence relationship (or functional relationship) between antenna configurations to original channel data for the first antenna configuration to secure augmented channel data for the second antenna configuration.

In the above-described example, assuming that the training entity is the receiver (e.g., terminal) (or, artificial neural network management entity of the receiver), the transmitter (e.g., base station) (or artificial neural network management entity of the transmitter) may deliver, to the receiver, information on a correspondence relationship (or functional relationship) between multiple antenna configurations. Accordingly, the present disclosure proposes a method in which the transmitter (e.g., base station) (or, artificial neural network management entity of the transmitter) delivers, to the receiver (e.g., terminal) (or, artificial neural network management entity of the receiver), information on the correspondence relationship (or functional relationship) between the first antenna configuration and the second antenna configuration when the transmitter can apply the first antenna configuration and the second antenna configuration. Here, the information on the correspondence relationship (or functional relationship) between antenna configurations may be delivered as explicit information that allows the receiver (or artificial neural network management entity of the receiver) to reconstruct the correspondence relationship (or functional relationship) between antenna configurations. Alternatively, the information on the correspondence relationship (or functional relationship) between antenna configurations may be delivered in a form of an executable file that allows the receiver (or artificial neural network management entity of the receiver) to apply the multi-antenna channel data for the first antenna configuration as input. In the latter case, an output after execution may be multi-antenna channel data (or augmented channel data) for the second antenna configuration. Here, the correspondence relationship (or functional relationship) between antenna configurations may be information on a correspondence relationship between antenna configurations actually applied in the transmitter. Alternatively, the information on the correspondence relationship (or functional relationship) between antenna configurations may be different from that of a correspondence relationship between the first and second antenna configurations actually applied in the transmitter. Accordingly, the information on the correspondence relationship (or functional relationship) between antenna configurations may be information delivered for reference for data augmentation. [Method 5] may be applied together with other proposed Method(s) of the present disclosure to the extent that they do not conflict with each other.

[Method 6]

The present disclosure proposes a method in which information on a correspondence relationship (or functional relationship) includes a linear transformation relationship between a first antenna configuration and a second antenna configuration as follows. The method may be used when a transmitter (e.g., base station) can apply the first antenna configuration and the second antenna configuration, and the transmitter (or artificial neural network management entity of the transmitter) can deliver, to a receiver, the information on the correspondence relationship between the first antenna configuration and the second antenna configuration.

(1) A relationship that corresponds N1 antenna ports in the first antenna configuration to N2 antenna ports in the second antenna configuration according to linear transformation A. A specific antenna port in the second antenna configuration may be expressed as a linear combination of one or more antenna ports in the first antenna configuration.

B. However, as an example, information on the correspondence relationship between antenna configurations, which is expressed as a linear transformation, may be delivered from the transmitter to the receiver in a form of a N2×N1 matrix.

As an exemplary embodiment of the present disclosure, in a mobile communication system consisting of a base station and a terminal, the terminal and the base station may utilize artificial neural networks for CSI feedback that compress and restore channel information. According to the proposed method of the present disclosure, a training entity of the artificial neural networks for CSI feedback may apply the correspondence relationship (or functional relationship) between antenna configurations to original channel data for the first antenna configuration to secure augmented channel data for the second antenna configuration. The transmitter (or, artificial neural network management entity of the transmitter) may deliver the information on the correspondence (or functional relationship) between the first antenna configuration and the second antenna configuration to the receiver (e.g., terminal) (or artificial neural network management entity of the receiver). The correspondence relationship (or functional relationship) between antenna configurations may exist in various forms. In most cases, the correspondence relationship (or functional relationship) between antenna configurations applied in current commercial mobile communication systems may be expressed as a linear transformation relationship.

Accordingly, in the present disclosure, the transmitter may apply the first antenna configuration and the second antenna configuration, and the transmitter may deliver the information on the correspondence relationship (or functional relationship) between the first antenna configuration and the second antenna configuration to the receiver. The information on the correspondence relationship (or functional relationship) may include a linear transformation relationship between the first antenna configuration and the second antenna configuration.

FIG. 8 is a conceptual diagram illustrating a first exemplary embodiment of a correspondence relationship between antenna configurations.

Referring to FIG. 8, a correspondence relationship between antenna configurations may be a linear relationship. Specifically, a receiver may generate an 8-port antenna configuration by applying linear combination in 4-port units to a 32-port antenna configuration. The receiver may configure a (n/4)-th port of the 8-port antenna configuration by linearly combining n-th, (n+1)-th, (n+2)-th, and (n+3)-th ports of the 32-port antenna configuration. Here, n may be a positive integer. In general, the linear transformation relationship between the first antenna configuration with the N1 ports and the second antenna configuration with the N2 ports may be expressed as a matrix as shown in Equation 1 below.

$$\begin{bmatrix} y_0 \\ \vdots \\ y_7 \end{bmatrix} = \begin{bmatrix} w_{0,0} & \cdots & w_{0,31} \\ \vdots & \ddots & \vdots \\ w_{7,0} & \cdots & w_{7,31} \end{bmatrix} \begin{bmatrix} x_0 \\ \vdots \\ x_{31} \end{bmatrix} \quad \text{[Equation 1]}$$

Here, $w_{i,j}$ may be a weight between the j-th port of the first antenna configuration and the i-th port of the second antenna configuration. $x_j$ may be a channel of the j-th port of the first antenna configuration, and $y_i$ may be a channel of the i-th port of the second antenna configuration. i and j may be positive integers. [Method 6] may be applied together with other proposed Method(s) of the present disclosure to the extent that they do not conflict with each other.

[Method 7]

The present disclosure proposes a method of delivering information on a correspondence relationship (or functional relationship) expressed as follows. The method may be used when a transmitter (e.g., base station) can apply a first antenna configuration and a second antenna configuration, and the transmitter (or, artificial neural network management entity of the transmitter) is able to deliver information on the correspondence relationship (or functional relationship) between the first antenna configuration and the second antenna configuration to a receiver (e.g., terminal) (or, artificial neural network management entity of the receiver).

(1) The transmitter may correspond a specific port of the second antenna configuration to a combination of port (s) of the first antenna configuration, to which time delay(s) and/or weight(s) are respectively applied, and the transmitter may deliver information on the time delay(s) and/or weight(s) to the receiver.

Here, the time delay(s) may be delivered based on a specific unit (e.g., sampling time).

As an exemplary embodiment of the present disclosure, in a mobile communication system consisting of a base station and a terminal, the terminal and the base station may utilize artificial neural networks for CSI feedback that compress and restore channel information. According to the proposed method of the present disclosure, a training entity of the artificial neural networks for CSI feedback may apply the correspondence relationship (or functional relationship) between antenna configurations to original channel data for the first antenna configuration to secure augmented channel data for the second antenna configuration. The transmitter (or, artificial neural network management entity of the transmitter) may deliver information on the correspondence relationship (or functional relationship) between the first antenna configuration and the second antenna configuration to the receiver (e.g., terminal) (or, artificial neural network management entity of the receiver). The correspondence relationship (or functional relationship) between antenna configurations may exist in various forms. As an example, the correspondence relationship (or functional relationship) between a high-dimensional antenna configuration and a low-dimensional antenna configuration may be defined as a relationship that corresponds a path, which is obtained by applying weights and time delays to port(s) in the high-dimensional antenna configuration and combining them, to a specific port in the low-dimensional antenna configuration. In other words, the correspondence relationship (or functional relationship) between the high-dimensional antenna configuration and the low-dimensional antenna configuration may be a form of applying a type of precoding or beamforming that converts the high-dimensional antenna configuration to a low-dimensional one. In this case, information on a phase for a beam weight may be expressed as a time delay, and the size of the beam weight may be expressed as a separate weight. [Method 7] may be applied together with other proposed Method(s) of the present disclosure to the extent that they do not conflict with each other.

[Method 8]

The present disclosure proposes a method for delivering an artificial neural network model capable of generating channel data. The method may be used when a transmitter (e.g., base station) (or, artificial neural network management entity of the transmitter) desires to exchange channel data with a receiver (e.g., terminal) (or, artificial neural network management entity of the receiver).

As an exemplary embodiment of the present disclosure, in a mobile communication system consisting of a base station and a terminal, the terminal and the base station may utilize artificial neural networks for CSI feedback that compress and restore channel information. In this case, a training entity for the artificial neural networks for CSI feedback may be the base station. In this case, the terminal may deliver channel data to the base station so that the base station performs training. Here, the channel data may vary depending on a geographical location of the terminal, surrounding environment, weather, network configurations, and the like. Accordingly, in order to train the artificial neural networks to operate in various scenarios/configurations, diverse and voluminous channel data may be required. In addition, a probabilistic nature of the channel data may change. Considering this, the terminal may need to continuously deliver massive channel data to the base station. As a result, excessive communication costs may occur.

Accordingly, the present disclosure proposes a method for delivering an artificial neural network model capable of generating channel data, when the transmitter (e.g., base station) (or, artificial neural network management entity of the transmitter) and the receiver (e.g., terminal) (or, artificial neural network management entity of the receiver) need to exchange channel data with each other. For example, the terminal may train a generative adversarial network (GAN) model capable of generating channel data, and deliver the trained GAN model to the base station. Accordingly, the base station may receive the GAN model from the terminal. Thereafter, the base station may generate channel data using the GAN model received from the terminal. Accordingly, the base station may use the corresponding channel data to train the artificial neural network. [Method 8] may be applied together with other proposed Method(s) of the present disclosure to the extent that they do not conflict with each other.

[Method 9]

The present disclosure proposes a method in which a first node delivers channel environment change information, and a second node generates augmented channel data by reflecting the channel environment change information based on at least one of the following schemes and utilizes the augmented channel data to train and construct an artificial neural network. The method may be used when the first node and the second node desire to exchange channel data therebetween.

(1) Obtain the augmented channel data by reflecting the channel environment change information to the original channel data (2) Obtain the augmented channel data by reflecting the channel environment change information in a channel generation model Here, the original channel data or the channel generation model may be delivered from the first node to the second node. Alternatively, the original channel data or the channel generation model may be configured by the second node itself. Here, in particular, the channel environment change information may include one or more of the following.

(1) Channel bandwidth (2) Number of subbands (3) Reference signal pattern (4) Terminal mobility (5) Signal-to-noise ratio (SNR)

(6) Interference environment

As an exemplary embodiment of the present disclosure, in a mobile communication system consisting of a base station and a terminal, the terminal and the base station may utilize artificial neural networks for CSI feedback that compress and restore channel information. In this case, a training entity for the artificial neural networks for CSI feedback may be the base station, and the terminal may deliver channel data to the base station so that the base station performs training. Here, the channel data may vary depending on a geographical location of the terminal, surrounding environment, weather, network configurations, and the like. Accordingly, in order to train the artificial neural networks to operate in various scenarios/configurations, diverse and voluminous channel data may be required. In addition, a probabilistic nature of the channel data may change. Considering this, the terminal may need to continuously deliver massive channel data to the base station. As a result, excessive communication costs may occur.

In this reason, when channel data is to be exchanged between the first node (e.g., base station) and the second node (e.g., terminal), the first node may deliver the channel environment change information to the second node. Then, the second node may receive the channel environment change information from the first node, and the second node may generate augmented channel data by reflecting the channel environment change information to original channel data, and use the augmented channel data to train and construct the artificial neural network.

As an example, the terminal may train a generation model (e.g., cycle GAN, style GAN, and/or the like) capable of changing a characteristic or domain of data, whereby the generation model generates channel data. Then, the terminal may deliver the generation model to the base station. Here, the terminal may deliver the channel environment change information to the base station together with the generation model. Then, the base station may receive the generation model and the channel environment change information from the terminal. The base station may generate augmented channel data suitable for channel environment changes by applying the channel environment change information as input to the generation model received from the terminal. The base station may utilize the augmented channel data to train and construct the artificial neural network. [Method 9] may be applied together with other proposed Method(s) of the present disclosure to the extent that they do not conflict with each other.

The present disclosure relates to methods of training and constructing artificial neural networks in a mobile communication system consisting of a base station and one or more terminals. The first node may deliver augmentation assistance information used for generating augmented channel data from original channel data to the second node. The second node may obtain the augmented channel data by applying the augmentation assistance information received to the original channel data. Then, the second node may utilize the augmented channel data to train and construct an artificial neural network.

When multiple antenna configurations are applicable for multiple antennas, the base station and the terminal may exchange information on a correspondence relationship (or function relationship) between antenna configurations as the augmentation assistance information. The terminal may augment channel data for an antenna configuration without original channel data by utilizing the correspondence relationship (or functional relationship) between original channel data for a specific (e.g., default or reference) antenna configuration and the corresponding antenna configuration, and the terminal may use the augmented channel data for training.

Alternatively, the base station and the terminal may exchange information on an artificial neural network model capable of generating channel data as the augmentation assistance information. The terminal may augment channel data of an antenna configuration without channel data by using original channel data or a random signal as input. The terminal may use the augmented channel data for training the artificial neural network.

According to the configuration of the present disclosure, for multiple antenna configurations of multiple antennas, channel data for another antenna configuration may be secured as training data for an artificial neural network by augmenting original channel data for a reference (default) antenna configuration, thereby remarkably reducing communication costs for training, without a need to perform a series of data collection processes such as transmission of channel measurement resources, channel measurement, and channel data transmission for each antenna configuration.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a terminal, comprising:

receiving default antenna configuration information from a base station;

receiving information on measurement resources according to the default antenna configuration information from the base station;

generating original channel data for the default antenna configuration by measuring the measurement resources;

receiving augmentation assistance information from a base station;

generating augmented channel data for an augmented antenna configuration by applying the augmentation assistance information to original channel data for the default antenna configuration; and training an artificial neural network using the augmented channel data, wherein the augmentation assistance information includes information on a correspondence relationship between the default antenna configuration and the augmented antenna configuration, and wherein the correspondence relationship between the default antenna configuration and the augmented antenna configuration is a linear transformation relationship between the default antenna configuration and the augmented antenna configuration.

2. The method according to claim 1, further comprising, before the generating of the augmented channel data, receiving channel environment change information from the base station, wherein the augmented channel data is generated by reflecting the received channel environment change information and applying the augmentation assistance information to the original channel data.

3. The method according to claim 2, wherein the channel environment change information includes at least one of information on a channel bandwidth, information on a number of subbands, information on a reference signal pattern, mobility information of the terminal, signal-to-noise ratio (SNR), or interference environment information.

4. The method according to claim 1, wherein the augmentation assistance information further includes at least one of a correspondence relationship between the original channel data and the augmented channel data, or information on an artificial neural network model for generating the augmented channel data from the original channel data.

5. The method according to claim 1, further comprising, before the receiving of the augmentation assistance information from the base station, requesting transmission of the augmentation assistance information from the base station.

6. The method according to claim 1, further comprising, before the receiving of the augmentation assistance information from the base station, transmitting, to the base station, terminal capability information including information on whether the terminal is able to utilize the augmentation assistance information; and receiving the augmentation assistance information transmitted from the base station based on the terminal capability information.

7. A method of a base station, comprising:

transmitting default antenna configuration information to a terminal;

transmitting information on measurement resources according to the default antenna configuration information to the terminal;

transmitting augmentation assistance information to the terminal;

receiving augmented channel data for augmented antenna configuration information from the terminal, the augmented channel data being generated by applying the augmentation assistance information to original channel data for the default antenna configuration information; and training an artificial neural network using the augmented channel data, wherein the augmentation assistance information includes information on a correspondence relationship between the default antenna configuration and the augmented antenna configuration, and wherein the correspondence relationship between the default antenna configuration and the augmented antenna configuration is a linear transformation relationship between the default antenna configuration and the augmented antenna configuration.

8. The method according to claim 7, further comprising, before the transmitting of the augmentation assistance information to the terminal, receiving, from the terminal, a request for transmission of the augmentation assistance information; and transmitting the augmentation assistance information to the terminal in response to the request for transmission of the augmentation assistance information.

9. The method according to claim 7, further comprising, before the transmitting of the augmentation assistance information to the terminal, receiving, from the terminal, terminal capability information including information on whether the terminal is able to utilize the augmentation assistance information; and transmitting the augmentation assistance information to the terminal based on the terminal capability information.

10. The method according to claim 7, further comprising, before the augmented channel data is generated, transmitting channel environment change information to the terminal, wherein the augmented channel data is data augmented from the original channel data by reflecting the channel environment change information.

11. A terminal comprising a processor, wherein the processor causes the terminal to perform:

receiving default antenna configuration information from a base station;

receiving information on measurement resources according to the default antenna configuration information from the base station;

generating original channel data for the default antenna configuration by measuring the measurement resources;

receiving augmentation assistance information from a base station;

generating augmented channel data for an augmented antenna configuration by applying the augmentation assistance information to original channel data for the default antenna configuration; and training an artificial neural network using the augmented channel data, wherein the augmentation assistance information includes information on a correspondence relationship between the default antenna configuration and the augmented antenna configuration, and wherein the correspondence relationship between the default antenna configuration and the augmented antenna configuration is a linear transformation relationship between the default antenna configuration and the augmented antenna configuration.

12. The terminal according to claim 11, wherein the processor further causes the terminal to perform, before the generating of the augmented channel data, receiving channel environment change information from the base station, wherein the augmented channel data is generated by reflecting the received channel environment change information and applying the augmentation assistance information to the original channel data.

13. The terminal according to claim 12, wherein the channel environment change information includes at least one of information on a channel bandwidth, information on a number of subbands, information on a reference signal pattern, mobility information of the terminal, signal-to-noise ratio (SNR), or interference environment information.

14. The terminal according to claim 11, wherein the augmentation assistance information further includes at least one of a correspondence relationship between the original channel data and the augmented channel data, or information on an artificial neural network model for generating the augmented channel data from the original channel data.

* * * * *